(12) United States Patent
Storhaug

(10) Patent No.: US 11,518,450 B2
(45) Date of Patent: Dec. 6, 2022

(54) LOADER CAB

(71) Applicant: Clark Equipment Company, West Fargo, ND (US)

(72) Inventor: Benjamin Storhaug, Bismarck, ND (US)

(73) Assignee: Clark Equipment Company, West Fargo, ND (US)

( * ) Notice: Subject to any disclaimer, the term of this patent is extended or adjusted under 35 U.S.C. 154(b) by 88 days.

(21) Appl. No.: 17/090,848

(22) Filed: Nov. 5, 2020

(65) Prior Publication Data

US 2021/0053628 A1  Feb. 25, 2021

Related U.S. Application Data

(62) Division of application No. 15/957,511, filed on Apr. 19, 2018, now Pat. No. 10,829,167.

(60) Provisional application No. 62/487,255, filed on Apr. 19, 2017.

(51) Int. Cl.
| | |
|---|---|
| *B62D 33/06* | (2006.01) |
| *B62D 33/07* | (2006.01) |
| *B62D 33/073* | (2006.01) |
| *B60J 1/00* | (2006.01) |
| *B60N 2/38* | (2006.01) |
| *E02F 9/16* | (2006.01) |

(52) U.S. Cl.
CPC .............. *B62D 33/07* (2013.01); *B60J 1/004* (2013.01); *B60N 2/38* (2013.01); *B62D 33/0617* (2013.01); *B62D 33/073* (2013.01); *E02F 9/16* (2013.01)

(58) Field of Classification Search
CPC .................................................. B62D 33/0617

USPC ..................................................... 296/190.08
See application file for complete search history.

(56) References Cited

U.S. PATENT DOCUMENTS

| | | | |
|---|---|---|---|
| 2,815,243 | A | 12/1957 | Campbell |
| 4,050,735 | A | 9/1977 | Molnar |
| 4,055,262 | A | 10/1977 | Bauer et al. |
| 4,061,393 | A | 12/1977 | Blomstrom |
| 4,079,985 | A | 3/1978 | Martin |
| 4,221,274 | A | 9/1980 | Martin, Jr. |
| D267,647 | S | 1/1983 | Baconet et al. |
| D267,648 | S | 1/1983 | Baconet et al. |

(Continued)

FOREIGN PATENT DOCUMENTS

| | | |
|---|---|---|
| CN | 1497107 A | 5/2004 |
| CN | 1741932 A | 3/2006 |

(Continued)

OTHER PUBLICATIONS

Invitation to Pay Additional Fees, And, Where Applicable, Protest Fee dated Jul. 13, 2018 for International Application No. PCT/US2018/028363 filed Apr. 19, 2018, 8 pages.

(Continued)

*Primary Examiner* — Joseph D. Pape
(74) *Attorney, Agent, or Firm* — John Veldhuis-Kroeze; Westman, Champlin & Koehler, P.A.

(57) ABSTRACT

Disclosed embodiments include power machine cabs, cab subassemblies, corresponding power machines such as skids steer loaders, and methods of assembling cabs and power machines. Some exemplary disclosed embodiments include features aiding in the manufacture of the cabs for power machines, features which allow the cabs to be configurable for different customer preferences or needs, and features which allow detection of tampering with the cab such that the power machine can be controlled accordingly.

9 Claims, 17 Drawing Sheets

(56) References Cited

U.S. PATENT DOCUMENTS

| | | |
|---|---|---|
| 4,408,672 A | 10/1983 | Albright et al. |
| D271,397 S | 11/1983 | Kuhn et al. |
| 5,272,836 A | 12/1993 | Gerst et al. |
| 5,362,118 A | 11/1994 | Houriez |
| 5,518,358 A | 5/1996 | Ashcroft et al. |
| 5,547,244 A | 8/1996 | Lee |
| 5,551,826 A | 9/1996 | Todd et al. |
| 5,577,795 A | 11/1996 | Shinsen |
| 5,941,330 A | 8/1999 | Miller et al. |
| 6,017,073 A | 1/2000 | Lindblom et al. |
| D424,778 S | 5/2000 | Dahl et al. |
| D427,612 S | 7/2000 | Shim |
| D437,862 S | 2/2001 | Shaw |
| 6,189,954 B1 | 2/2001 | Martin, Jr. |
| 6,382,711 B2 | 5/2002 | Martin, Jr. |
| 6,543,563 B1 | 4/2003 | Muraro |
| 6,578,907 B2 | 6/2003 | Teich |
| 6,669,272 B2 | 12/2003 | Ayabe et al. |
| 6,773,056 B2 | 8/2004 | Fischer et al. |
| 6,910,731 B2 | 6/2005 | Albright et al. |
| 7,246,846 B2 | 7/2007 | Shioji et al. |
| 7,252,325 B2 | 8/2007 | Richards et al. |
| D553,160 S | 10/2007 | Jones et al. |
| 7,338,114 B2 | 3/2008 | Ishii et al. |
| 7,347,488 B2 | 3/2008 | Hayes et al. |
| 7,364,223 B2 | 4/2008 | Mori et al. |
| D570,381 S | 6/2008 | Kato |
| 7,401,848 B2 | 7/2008 | Haboon et al. |
| 7,416,244 B2 | 8/2008 | Polk et al. |
| 7,575,272 B2 | 8/2009 | Ishii et al. |
| 7,712,818 B2 | 5/2010 | Yano et al. |
| 7,731,273 B2 | 6/2010 | Hagele et al. |
| 7,744,148 B2 | 6/2010 | Jones et al. |
| D636,795 S | 4/2011 | Yamamoto et al. |
| D637,630 S | 5/2011 | Yamamoto et al. |
| 7,934,767 B2 | 5/2011 | Kim et al. |
| 7,946,370 B2 | 5/2011 | Albright et al. |
| D642,205 S | 7/2011 | Yamamoto et al. |
| 7,975,793 B1 | 7/2011 | Claas et al. |
| 8,016,345 B1 | 9/2011 | Goddard et al. |
| 8,091,955 B2 | 1/2012 | Hill et al. |
| 8,182,024 B2 | 5/2012 | Hayes et al. |
| 8,246,107 B2 | 8/2012 | Miyasaka |
| 8,303,026 B2 | 11/2012 | Yamashita et al. |
| 8,448,735 B2 | 5/2013 | Vierkant et al. |
| 8,496,282 B2 | 7/2013 | Murakami et al. |
| 8,978,812 B2 | 3/2015 | Kimura et al. |
| 9,010,846 B2 | 4/2015 | Ohta et al. |
| 9,021,764 B2 | 5/2015 | Yoon |
| 9,045,882 B2 | 6/2015 | Major et al. |
| 9,096,280 B2 | 8/2015 | Sintek et al. |
| D742,940 S | 11/2015 | Kushita et al. |
| 9,193,396 B2 | 11/2015 | Davisdon et al. |
| 9,327,774 B2 | 5/2016 | Valerio et al. |
| 10,647,364 B2 | 5/2020 | Tilp et al. |
| 2002/0144849 A1 | 10/2002 | Peddycord et al. |
| 2004/0245806 A1 | 12/2004 | Mori et al. |
| 2006/0017308 A1 | 1/2006 | Kojima et al. |
| 2006/0071499 A1 | 4/2006 | Yoon |
| 2006/0254095 A1 | 11/2006 | Ishii et al. |
| 2007/0145780 A1 | 6/2007 | Tecklenburg et al. |
| 2010/0264695 A1 | 10/2010 | Hill et al. |
| 2014/0161578 A1 | 6/2014 | Kimura et al. |
| 2015/0239510 A1 | 8/2015 | Davisdon et al. |
| 2015/0298746 A1 | 10/2015 | Saito et al. |
| 2015/0345210 A1 | 12/2015 | Balasubramanian et al. |
| 2016/0053459 A1 | 2/2016 | Webb et al. |
| 2016/0090711 A1 | 3/2016 | Sumiyoshi et al. |
| 2016/0096553 A1 | 4/2016 | Valerio et al. |
| 2016/0114837 A1 | 4/2016 | Iwahashi et al. |

FOREIGN PATENT DOCUMENTS

| | | |
|---|---|---|
| CN | 1757833 A | 4/2006 |
| CN | 1780754 A | 5/2006 |
| CN | 102395506 A | 3/2012 |
| CN | 103764920 A | 4/2014 |
| EP | 0909855 A2 | 4/1999 |
| EP | 1066998 A2 | 1/2001 |
| JP | S62125916 A | 6/1987 |
| WO | 2007/073457 A1 | 6/2007 |

OTHER PUBLICATIONS

International Search Report and Written Opinion dated Sep. 28, 2018 for International Application No. PCT/US2018/028363 filed Apr. 19, 2018, 21 pages.

Second Office Action for Chinese Patent Application No. 201880026119.2, dated Jul. 4, 2022, 12 pages.

First Office Action, including search report, for Chinese Patent Application No. 201880026119.2, dated Jun. 28, 2021, 19 pages.

LOADER CAB

CROSS-REFERENCE TO RELATED APPLICATION(S)

This application is a divisional of U.S. application Ser. No. 15/957,511, filed on Apr. 19, 2018, which published as US 2018-0304939 A1 on Oct. 25, 2018, which claims the benefit of U.S. Provisional Application No. 62/487,255, which was filed on Apr. 19, 2017.

BACKGROUND

The present disclosure is directed toward power machines. More particularly, the present disclosure is directed toward cabs of power machines such as loaders that create an operator compartment from which an operator can control the power machine. Power machines, for the purposes of this disclosure, include any type of machine that generates power to accomplish a particular task or a variety of tasks. One type of power machine is a work vehicle. Work vehicles, such as loaders, are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Power machines typically include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

Some power machines have a cab that is mounted to the frame of the power machine. Some cabs can be rotated relative to the frame to provide access to power machine components under the cab. Securing the cab to the frame can be labor intensive, requiring tool access in difficult to reach locations to tighten fasteners. In addition, manufacturing cabs can present challenges with installation of components within the cab. Further, manufacturing different cabs configured for different customer preferences or requirements can increase costs and complexity associated with the manufacturing process.

The discussion above is merely provided for general background information and is not intended to be used as an aid in determining the scope of the claimed subject matter.

SUMMARY

This Summary and the Abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

Disclosed embodiments include power machine cabs, cab subassemblies, corresponding power machines such as skid steer loaders, and methods of assembling cabs and power machines. Some exemplary disclosed embodiments include features aiding in the manufacture of the cabs for power machines, features which allow the cabs to be configurable for different customer preferences or needs, and features which allow detection of tampering with the cab such that the power machine can be controlled accordingly.

DESCRIPTION

The concepts disclosed in this discussion are described and illustrated by referring to illustrative embodiments. These concepts, however, are not limited in their application to the details of construction and the arrangement of components in the illustrative embodiments and are capable of being practiced or being carried out in various other ways. The terminology in this document is used to describe illustrative embodiments and should not be regarded as limiting. Words such as "including," "comprising," and "having" and variations thereof as used herein are meant to encompass the items listed thereafter, equivalents thereof, as well as additional items.

Disclosed embodiments are directed to power machine cabs configured to be rotatably or pivotally mounted to a power machine frame and then secured to prevent rotation. Some disclosed embodiments include features which allow the cab to be secured to prevent rotation in a manner which is more convenient for a person working on the power machine and which can be accomplished using fewer tools.

Also, in some disclosed embodiments, cabs are formed of first and second cab subassemblies, with the first cab subassembly including a weldment with the cab frame and primary structural components, and the second cab subassembly including a seat subassembly having a seat mounted on seat panels. The second cab subassembly can then be secured to the first cab subassembly to form the cab in a manner which simplifies manufacturing processes, allows better access to work on the respective subassemblies, etc.

In yet other embodiments, a base cab model includes a weldment having a first portion of the operator compartment with a protective screen material, and a second portion of the operator compartment without the protective screen material but configured to have protective screen material or transparent material such as polycarbonate secured in place. As such, these embodiments provide a simplified manufacturing process while allowing cabs to be configurable to satisfy preferences of certain customers. In some embodiments, a sensor is included to detect whether a portion of protective transparent material has been removed from the cab. Using this information, the power machine can then be automatically controlled to prevent or limit operation some operations of the power machine until the protective transparent material has been replaced.

Figure 2:
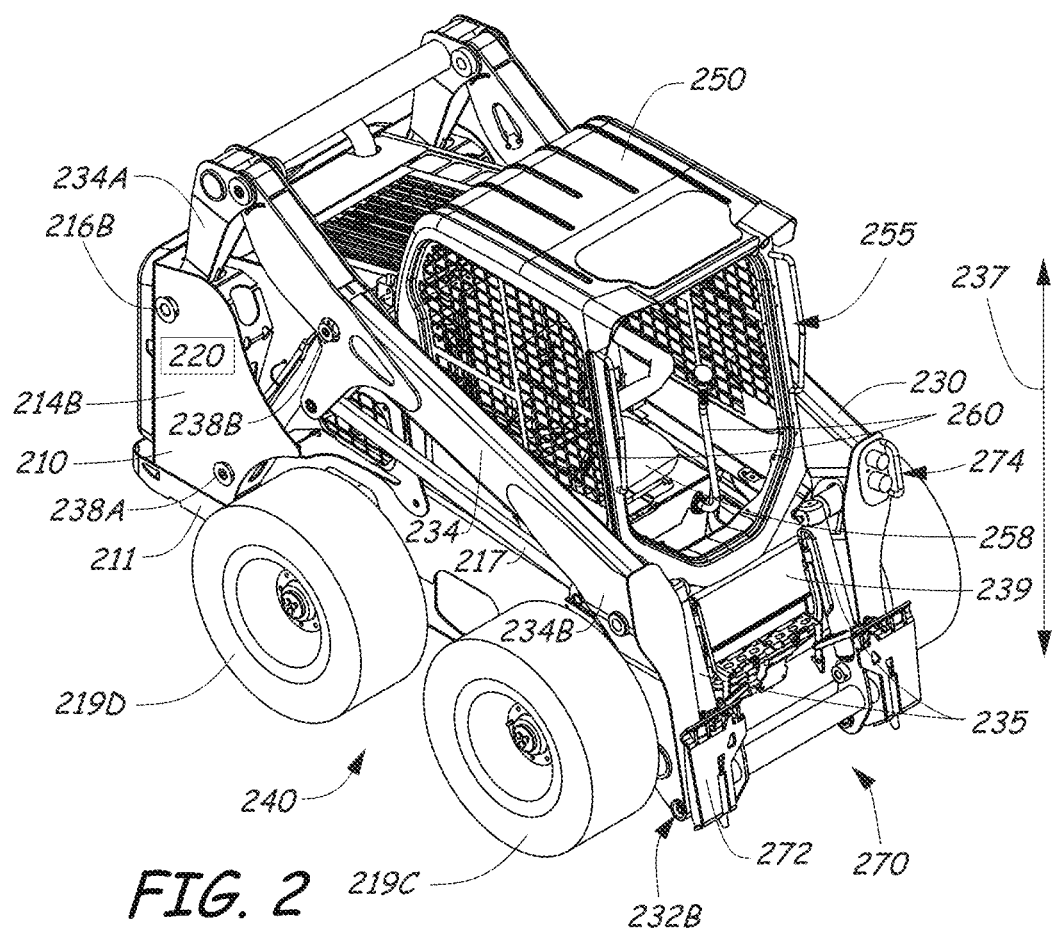
FIG. 2 is a front perspective view of a power machine on which embodiments disclosed herein can be advantageously practiced.
Figure 3:
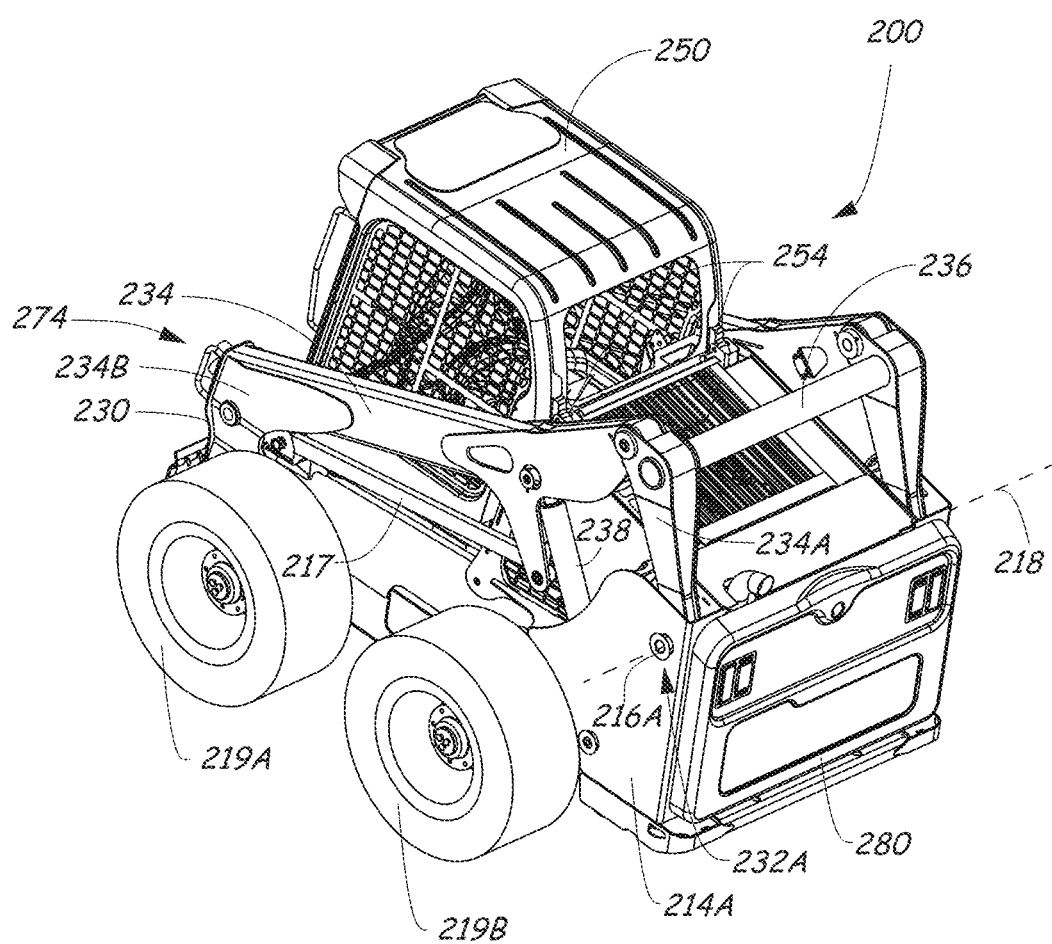
FIG. 3 is a rear perspective view of the power machine shown in FIG. 2.

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine (i.e., a skid-steer loader) is illustrated and discussed as being a representative power machine. However, as mentioned above, the embodiments below can be practiced on various types of power machines, including power machines of different types from the representative power machine shown in FIGS. 2-3.

Power machines, for the purposes of this discussion, include a frame, at least one work element, and a power source that is capable of providing power to the work element to accomplish a work task. One type of power machine is a self-propelled work vehicle. Self-propelled work vehicles are a class of power machines that include a frame, work element, and a power source that is capable of providing power to the work element. At least one of the work elements is a motive system for moving the power machine under power.

Figure 1:
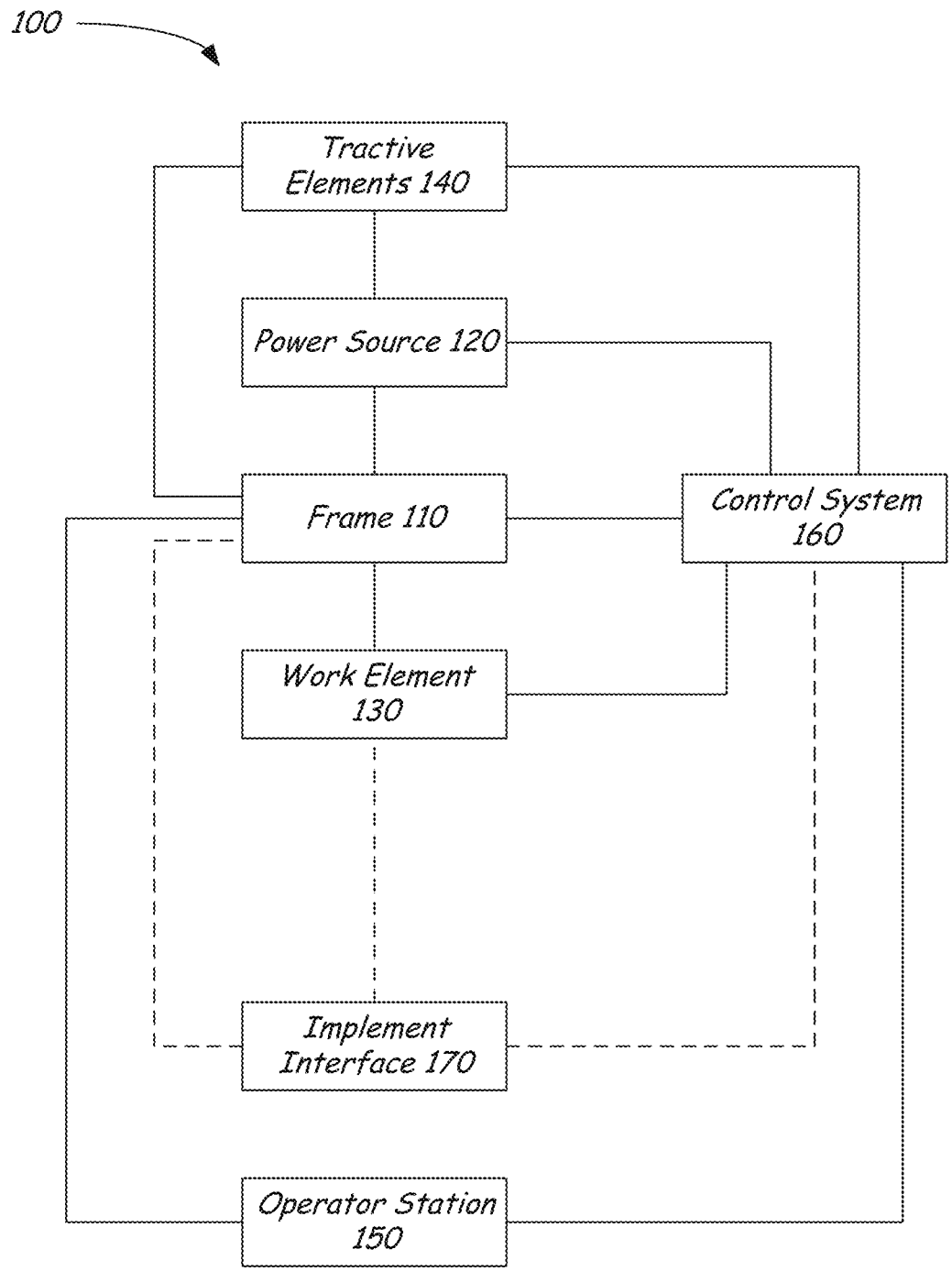
FIG. 1 is a block diagram illustrating functional systems of a representative power machine on which embodiments of the present disclosure can be advantageously practiced.

FIG. 1 shows a block diagram illustrating the basic systems of a power machine 100 upon which the embodiments discussed below can be advantageously incorporated and can be any of a number of different types of power machines. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion (so-called articulated frames) for accomplishing steering functions.

Frame 110 supports the power source 120, which can provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is capable of converting the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 has an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, even if they have operator compartments or operator positions, may be capable of being operated remotely (i.e. from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e. remote from both the power machine and any implement to which is it coupled) that is capable of controlling at least some of the operator-controlled functions on the power machine.

FIGS. 2-3 illustrates a loader 200, which is one example of the power illustrated in FIG. 1 where the embodiments discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements.

The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220 that can generate or otherwise providing power for operating various functions on the power machine. Power system 220 is shown in block diagram form but is located within the frame 210. Frame 210 also supports a work element in the form of a lift arm assembly 230 that is powered by the power system 220 for performing various work tasks. As loader 200 is a work vehicle, frame 210 also supports a traction system 240, powered by power system 220, for propelling the power machine over a support surface. The power system 220 is accessible from the rear of the machine. A tailgate 280 covers an opening (not shown) that allows access to the power system 220 when the tailgate is an opened position. The lift arm assembly 230 in turn supports an implement interface 270 that provides attachment structures for coupling implements to the lift arm assembly.

The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair. The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine.

Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that include and/or interact with the embodiments discussed below can have various frame components that support various work elements. The elements of frame 210 discussed herein are provided for illustrative purposes and frame 210 is not the only type of frame that a power machine on which the embodiments can be practiced can employ. The elements of frame 210 discussed herein are provided for illustrative purposes and is not necessarily the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200 is attached to the undercarriage 211 such as with fasteners or by welding the undercarriage to the mainframe. Mainframe 212 includes a pair of upright portions 214A and 214B located on either side and toward the rear of the mainframe that support lift arm structure 230 and to which the lift arm structure 230 is pivotally attached. The lift arm structure 230 is illustratively pinned to each of the upright portions 214A and 214B. The combination of mounting features on the upright portions 214A and 214B and the lift arm structure 230 and mounting hardware (including pins used to pin the lift arm structure to the mainframe 212) are collectively referred to as joints 216A and 216B (one is located on each of the upright portions 214) for the purposes of this discussion. Joints 216A and 216B are aligned along an axis 218 so that the lift arm structure is capable of pivoting, as discussed below, with respect to the frame 210 about axis 218. Other power machines may not include upright portions on either side of the frame or may not have a lift arm structure that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports tractive elements in the form of wheels 219A-D (collectively, 219) on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path, although the path may not actually be exactly vertical. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is located proximal to a second end 232B of the lift arm assembly 234. The implement interface 270 includes an implement carrier 272 that can accept and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as skid-steer loader 200, unless otherwise noted or recited, the concepts discussed below are not intended to be limited in their application to the environments specifically described above.

Figure 4:
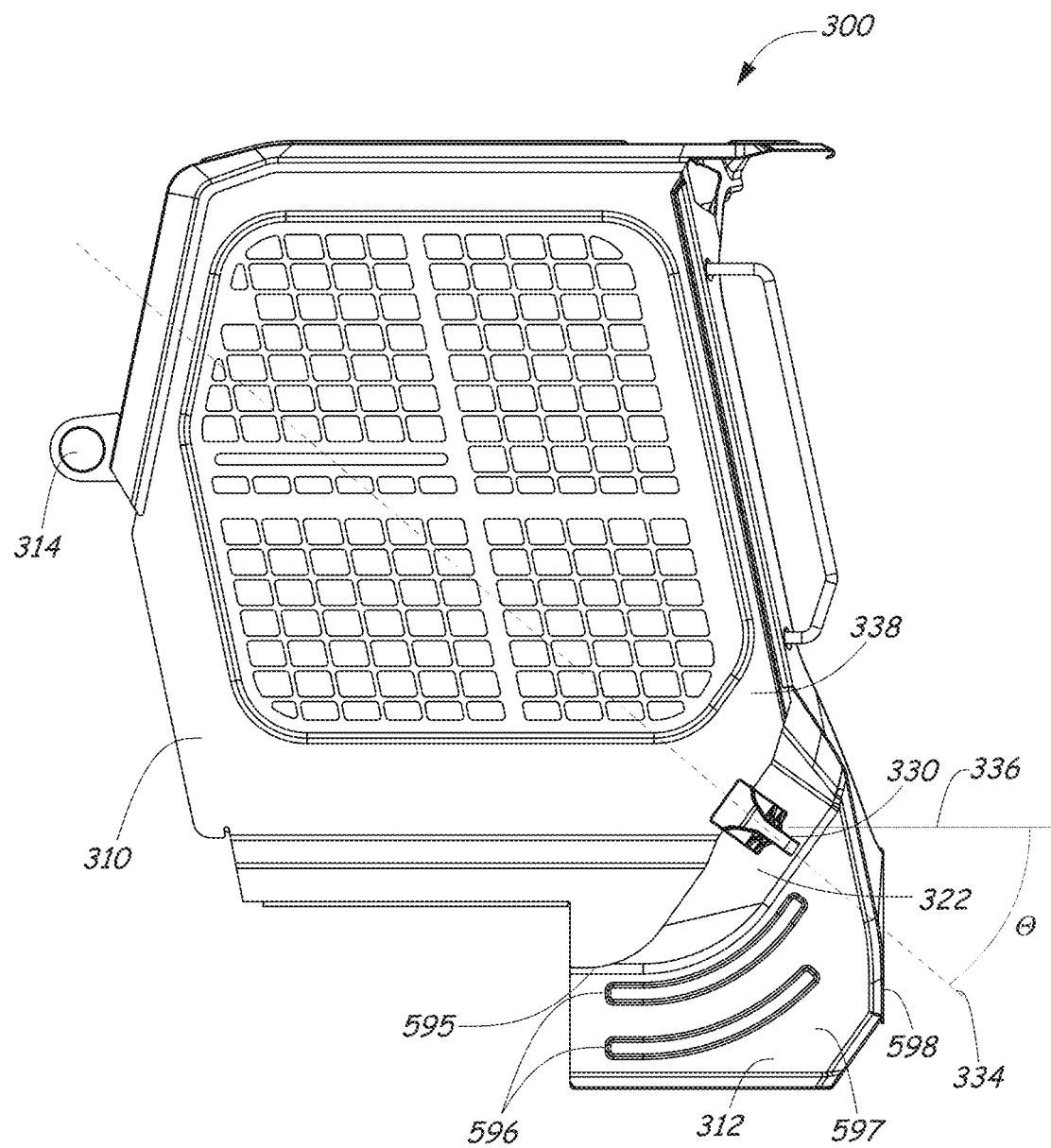
FIG. 4 is a side view illustration of a cab assembly for use on power machines such as those shown in FIGS. 2-3 according to one illustrative embodiment.
Figure 17:
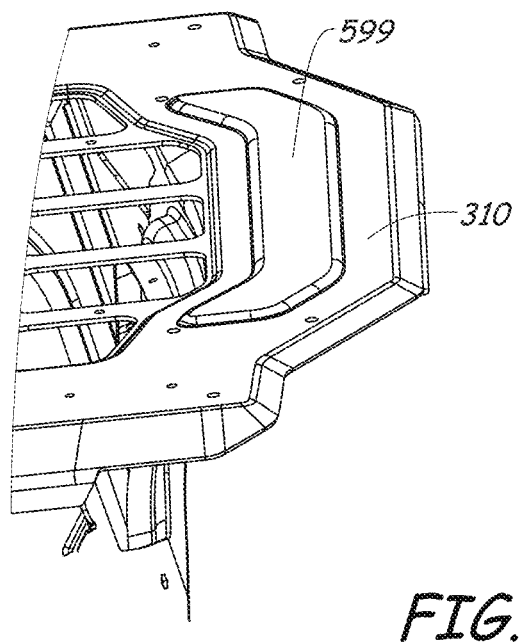
FIG. 17 illustrate features of a top portion of a cab such as shown in FIG. 4.

FIG. 4 illustrates an embodiment of a cab assembly 300 for use with power machines such as those described above with reference to FIGS. 2-3. Cab assembly 300 includes a cab frame 310 that provides the general structure of the cab assembly. Cab frame 310 defines an operator compartment in which an operator can be seated and supports control inputs and the like for an operator station from which an operator can control a power machine. To that end, the cab frame 310 is configured to support a seat, as will be discussed in more detail below. A frontal lower portion 312 of the cab 310 is an area that extends below a main part of the cab assembly 300 and below a door on the cab assembly (door not shown) and provides an area for an operator to place his or her legs when sitting in the cab. Reinforcement grooves or ribs 596 are formed in a side 597 of the lower portion 312 strengthen the metal or material of the lower portion and prevent warping or other deformation. In an exemplary embodiment, the ribs 596 follow arcuate paths to optimize the strengthening and strengthened locations. In some exemplary embodiments, the arcuate paths of ribs 596 are substantially parallel a bend 595 between side 597 and the adjacent portion of cab frame 310. A similar type of reinforcing rib 599 is provided in a front of a top portion of the cab as is shown in FIG. 17.

Returning again to FIG. 4, cab assembly 300 is configured to be pivotally mounted to a frame of a power machine about a cab pivot attachment 314. Cab pivot attachment 314 is configured to allow the cab assembly 300 to be pivotally attached to a frame of a power machine (as the mounts 254 in FIG. 3 illustrate) such that the cab assembly 300 can be pivoted about cab pivot attachment 314 relative to the frame when not further secured to the frame to prevent such rotation. A mounting tab or cab mount 330, positioned typically at the front of the cab assembly, extends from a surface 332 of the cab frame and is used to secure the cab assembly 300. Surface 332 is also angled relative to horizontal direction 336.

Cab mount 330 illustratively extends in a direction along an axis or line segment 334 orthogonal to surface 332, which is oriented at an angle Θ relative to horizontal direction 336 of approximately 35 degrees. Cab mount 330 is, in this embodiment, is secured to front surface 332 of the cab assembly and extends substantially orthogonally from the surface 332. In some embodiments as shown here, cab mount 330 is also secured to a side surface of the cab assembly as discussed further below. Cab mount 330 is a casting. In other embodiments, the cab mount can be a piece of metal or a weldment. In other embodiments, the angle of orientation of cab mount 330 need not be orthogonal to surface 332 and can be oriented to other than 35 degrees. For example, in some embodiments, the angle of cab mount 330 is approximately 45 degrees. In still other embodiments, the interface between cab mount 330 and components on the frame of the power machine is optimized by forming cab mount 330 in the same plane as axis or line segment along which pivot attachment 314 extends. In other words, axis or line segment 334 along which cab mount 330 extends can extend through pivot attachment 314 in order to minimize the elongated shape required of an aperture extending through cab mount 330 which receives a securing member when the cab is pivoted fully forward and secured to the cab frame to prevent rotation. However, this need not be the case in all embodiments, and in the illustrated embodiment axis or line segment 334 is offset from pivot attachment 314. The offset can be limited to a range of between about 20 degrees and about 70 degrees and more particularly between about 25 degrees to about 45 degrees to minimize the elongation (e.g., relative to a circular shape) of the aperture in some embodiments. The angle of the cab mount 330 allows the cab mount to engage with a cab mounting structure more easily as the cab 300 is pivoted into a downward position about a joint formed at the connection of the cab to the pivot attachment 314. In addition, the angle of the cab mount 330 allows easy access to hardware to loosen the cab from the frame when it is desirable to raise the cab for servicing the loader.

In exemplary embodiments, cab assembly 300 includes, as part of the main weldment created during a manufacturing process, side portions 338 of the frame 310 which support one or more screened portions along each side of the cab. As described below, and shown in FIGS. 5-7, side portions of the frame can also define non-screened portions which allow for the configuration of the cab assemblies with screens and/or transparent material.

Figure 5:
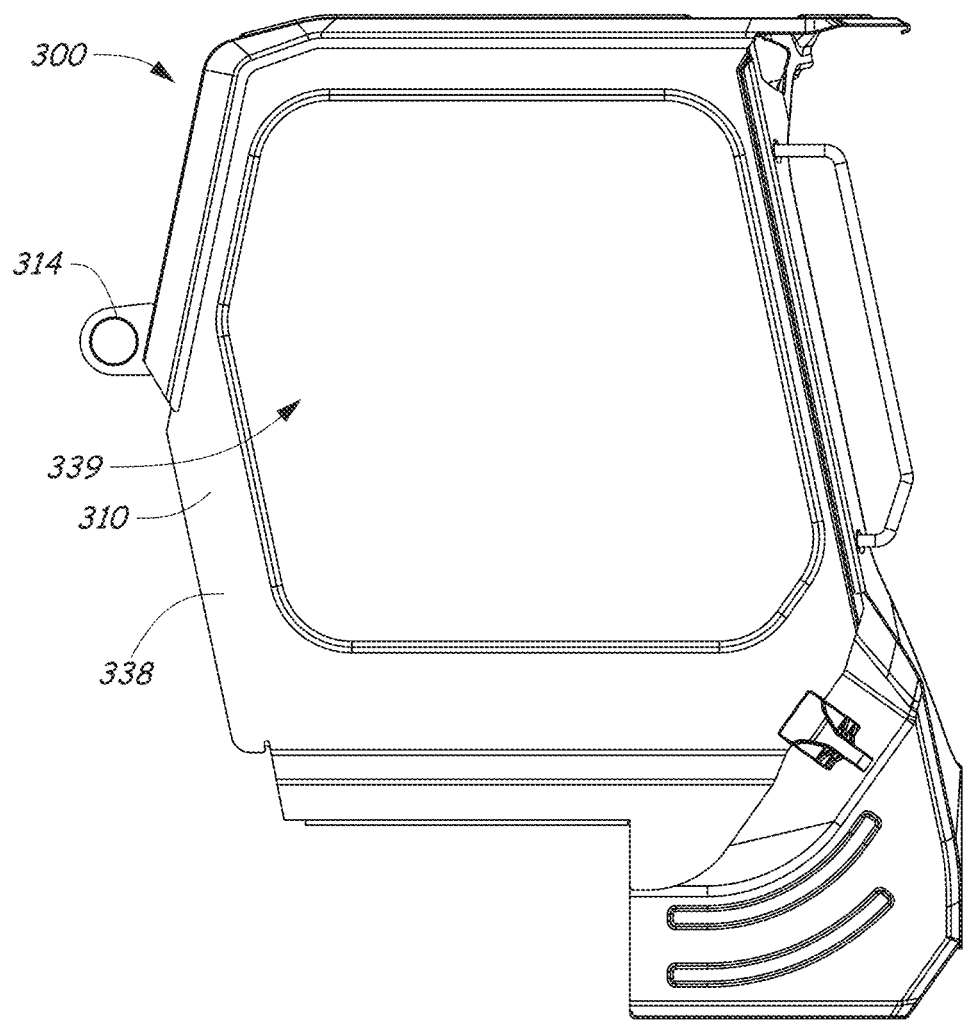
FIG. 5 is a side view illustration of a cab frame for use with the cab assembly of FIG. 4 according to one illustrative embodiment.
Figure 6:
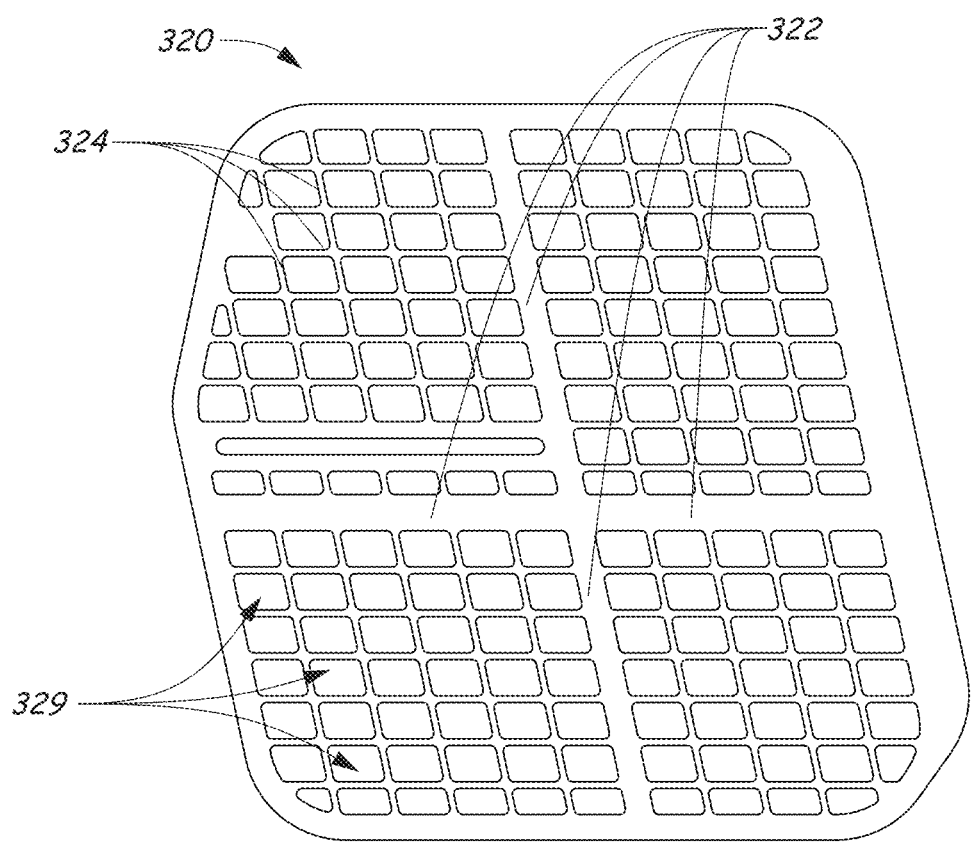
FIGS. 6-7 are side view illustrations of side panel attachable to the cab frame of FIG. 5 according to illustrative embodiments.
Figure 7:
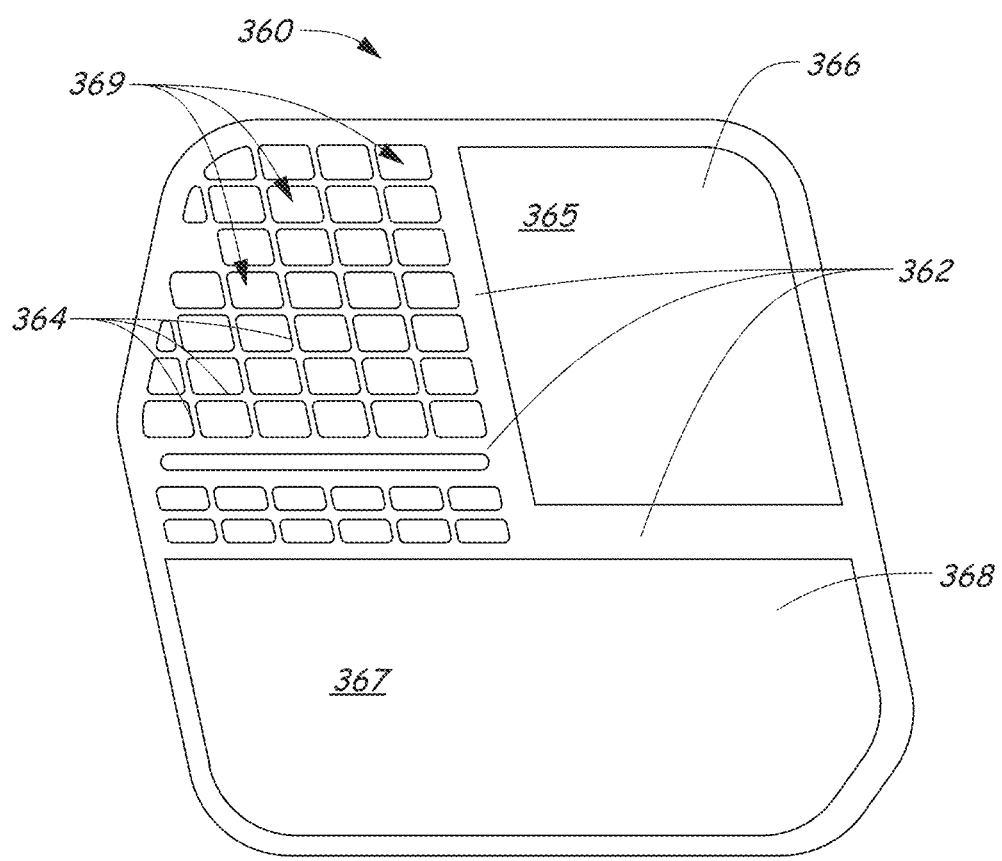

For further illustration, FIG. 5 shows side portions 338 of frame 310 defining an opening 339 with no side screens present. FIG. 6 illustrates an embodiment of a full side screen 320 that can be attached to the side portions 338 of frame 310 to cover opening 339. Side screens such as side screen 320 can be welded or otherwise fastened to the frame 310. Alternatively, the side screen 320 can be integrated into the frame 338 (such as by a forming process, which can be a laser cut, a punch press or other suitable fabrication technique). The side screen 320 has a plurality of primary ribs 322 and secondary ribs 324 that define a plurality of apertures 329 through which an operator can see. FIG. 7 illustrates another embodiment of a side screen 360 which can cover a portion of opening 339. The side screen 360 has a plurality of primary ribs 362 and secondary ribs 364 that define a plurality of apertures 369 through which an operator can see. In addition, side screen 360 has a first large aperture 365 and a second large aperture 367 that are not covered by a pattern of secondary ribs. These large apertures 365 and 367 can be covered by pieces of transparent material such as glass, plexiglass, or other acrylic plastic or similar material, represented in FIG. 7 at reference numbers 366 and 368. The covers of transparent material that cover large apertures 365 and 367 can be separate pieces of material or a single piece of transparent material. In some embodiments, the transparent material covering one or more large apertures can be moveable from a closed position in which the transparent material covers the large aperture (for example large apertures 365) and an open position where the transparent material covers only a portion, or even none of the aperture. In other embodiments, a transparent material can cover the portion of the side screen that is also covered by ribs 364 and can be moved to an open position to such as the area at 365. Various configurations of side screens can be employed. The side screens 320 and 360 can be attached to or integrated with the frame 310 in similar ways.

Figure 8:
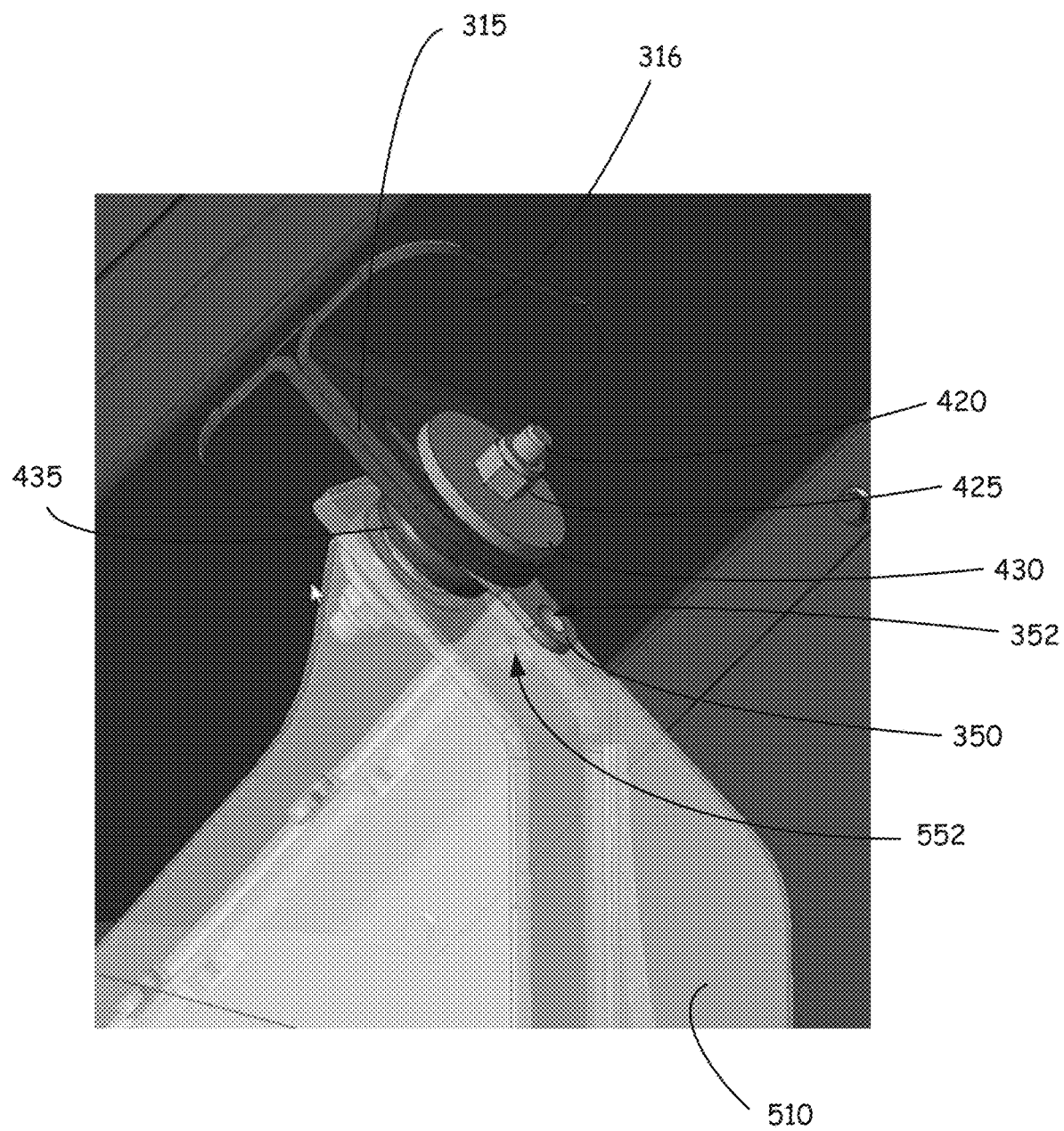
FIGS. 8-10 are diagrammatic illustrations of a mounting tab or cab mount and related components used to secure the cab shown in FIG. 4 to the frame of the power machine in some exemplary embodiments.
Figure 9:
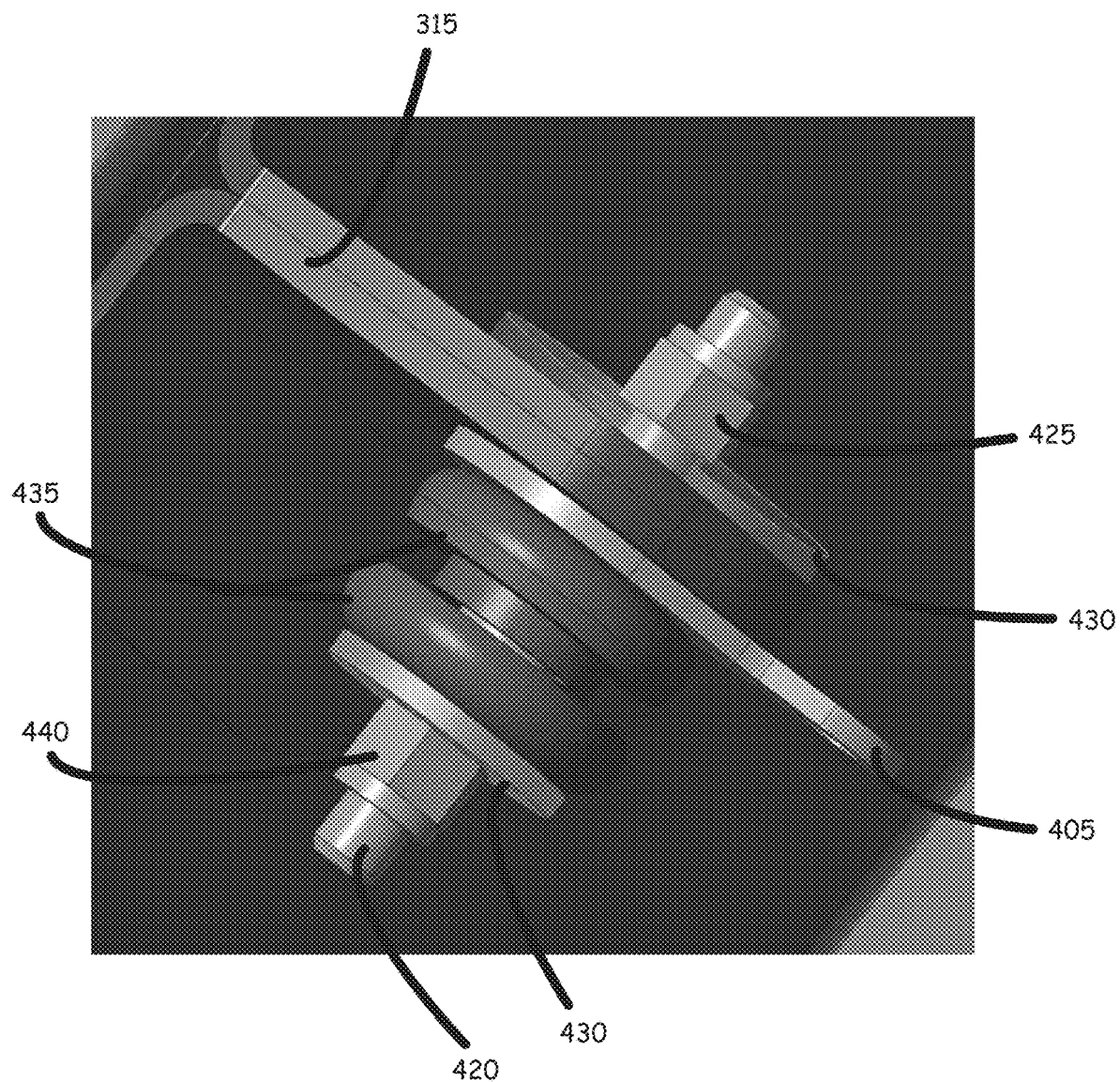
Figure 10:
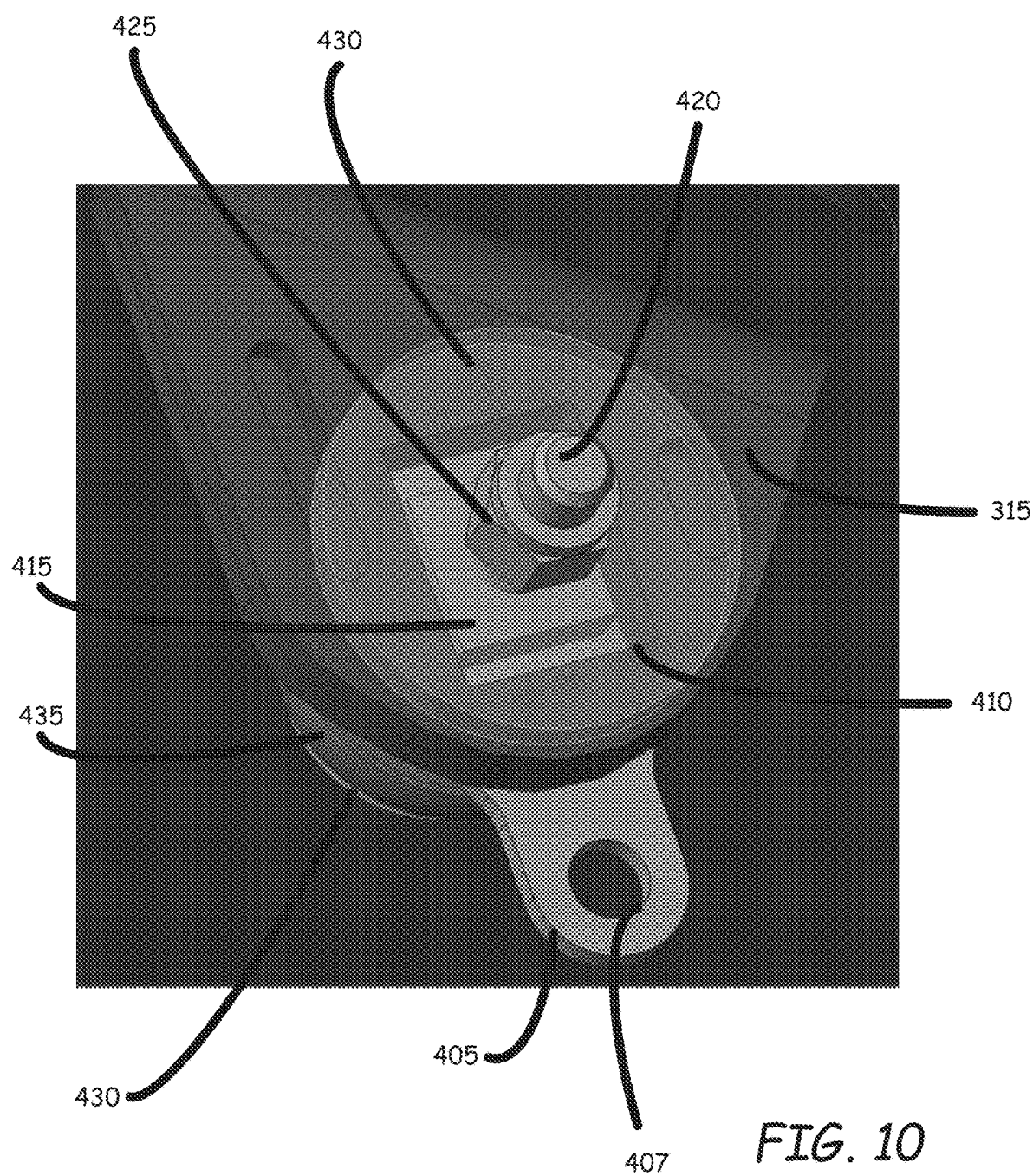
Figure 11:
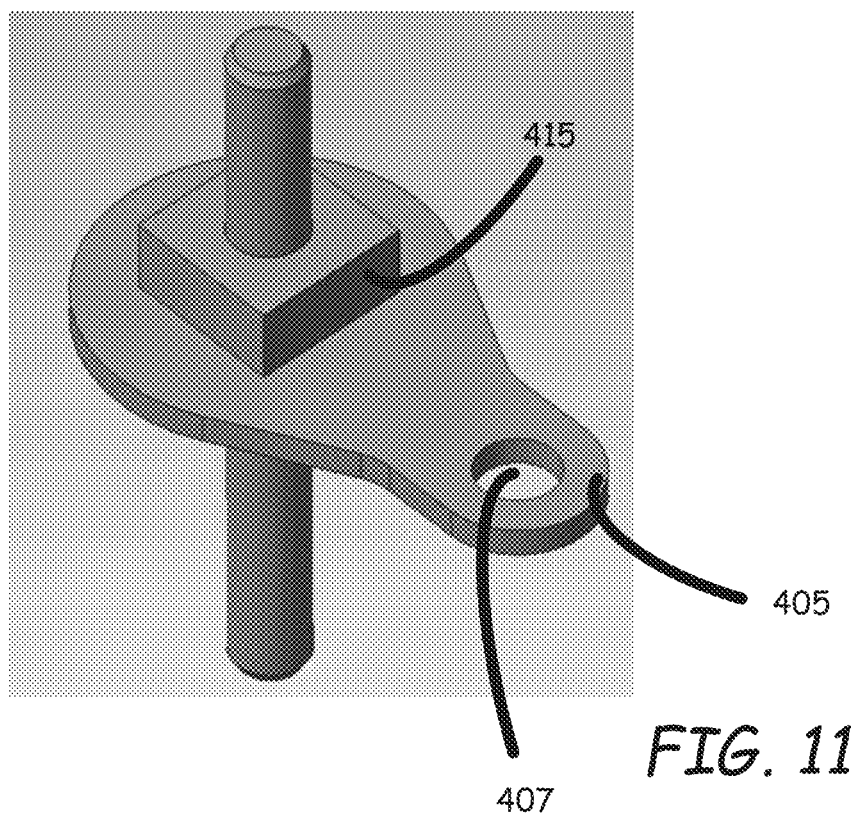
FIGS. 11-12 illustrate a mounting structure of the type shown in FIGS. 8-10.
Figure 12:
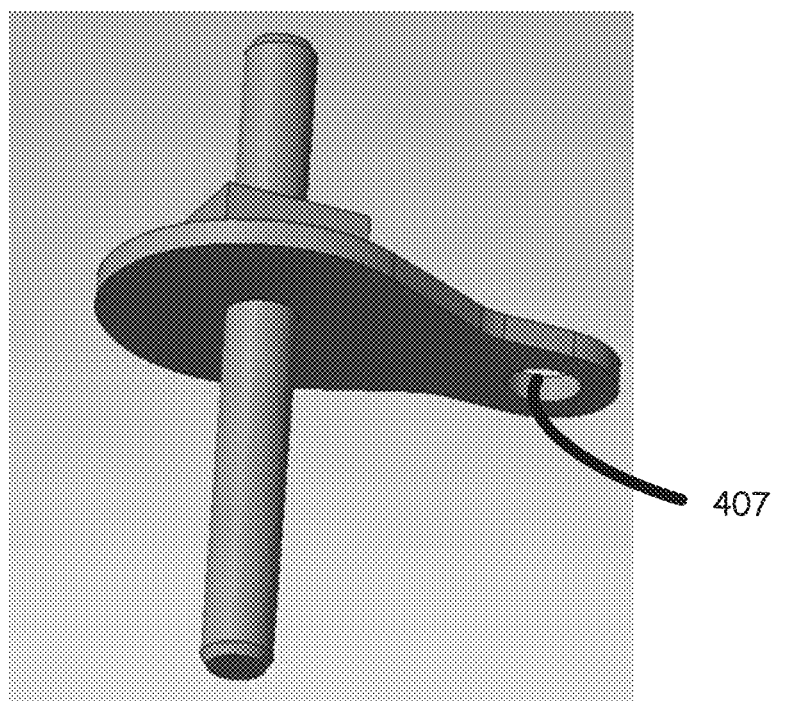

FIGS. 8-10 show cab mount 315 and associated hardware for securing the cab mount 315 to cab mounting structure 405 according to one embodiment. The cab mounting structure 405 (shown in more detail in FIGS. 11-12) and the cab mount 315 cooperate to prevent the cab assembly 300 from rotating about cab pivot attachment 314 (shown in FIGS. 4-7) and secure the cab to the machine frame. Cab mounting structure 405 is mounted to machine frame 510, which is an embodiment of machine frames 110 and 210 discussed above. Cab mounting structure 405 includes an aperture 407 that is provided to assist in the bolting or otherwise fastening of the cab mounting structure 405 to the frame 510 of the power machine. The cab mounting structure 405 is secured to the frame 510 prior to pivoting cab assembly 300 about the cab pivot attachment 314. The cab assembly 300 is then secured to the frame 510 by secured the cab assembly to the cab mounting structure. During the process of securing the cab mounting structure 405 to the frame 510, an object can be inserted through aperture 407 and a corresponding aperture 408 in the frame 510 to make sure that the cab mounting structure 405 is properly aligned and more importantly, that the cab mounting structure does not rotate while it is being fastened to the frame 510, thereby allowing the cab mounting structure to be properly tightened to the frame.

Cab mount 330 includes an aperture 410 extending through the mount. Cab mounting structure 405 has a complementary engagement member 415 extending from a surface of the cab mounting structure and positioned adjacent cab mounting structure 405, aperture 410 receives member 415. The relationship between member 415 and aperture 410 is best seen in FIG. 10. A threaded stud 420 extends through or from member 415. A first nut 425 can be threaded onto an end of stud 420 to secure cab mount 315 and cab assembly 300 to the frame 510. Washers 430 and isolators 435 can be positioned between first nut 425 and a second nut 440 to aid in securing cab mount 330 to cab mounting structure 405, and isolating vibrations from being transferred between frame 510 and cab assembly 300.

Member 415 on structure 405 and the rectangular aperture 410 in prevent rotation of the cab mounting structure 405 when nut 425 is tightened to mount 330, and thus secure mount 330 and cab assembly 300 to cab mounting structure 405 and frame 510, with only a single tool. Engagement between anti-rotation member 415 and rectangular aperture 410 prevents rotation of stud 420 and other components while nut 425 is being fastened. This allows easier access and manipulation since it is not required that tools be used on both sides of cab mount 330 to engage both of nuts 425 and 440 simultaneously to prevent rotation.

FIGS. 13-16 illustrate cab mount 330 and associated hardware for securing the cab mount 330 to a cab mounting structure 581. The cab mounting structure 581 and the cab mount 330 cooperate to prevent the cab assembly 300 from rotating about cab pivot attachment 314 and secure the cab to the machine frame 510. Cab mounting structure 581 includes an aperture 582 that performs substantially the same function as the aperture 407 discussed above when fastening the cab mounting structure 581 to the frame 510.

Cab mount 330 is, in some embodiments, a single cast piece of metal, but need not be in all embodiments. Cab mount 330 includes a base portion 570 and a mounting portion 576 which extends generally orthogonally from base portion 570. Base portion 570 includes a first mounting surface 572 configured to be mounted to front surface 332 (shown in FIGS. 4 and 13) of the cab frame 310, and a second mounting surface 574 configured to be mounted to a side surface 333 (shown in FIG. 13) of the cab frame. Mounting surfaces 572 and 574 can be, for example, welded to the front and side surfaces of the cab frame, attached with bolts or other fasteners, etc. In some exemplary embodiments, mounting surfaces 572 and 574 can be substantially orthogonal to each other to interface with the front and side surfaces 332 and 333 of the cab frame, but surfaces 572 and 574 need not be orthogonal in all embodiments.

Figure 13:
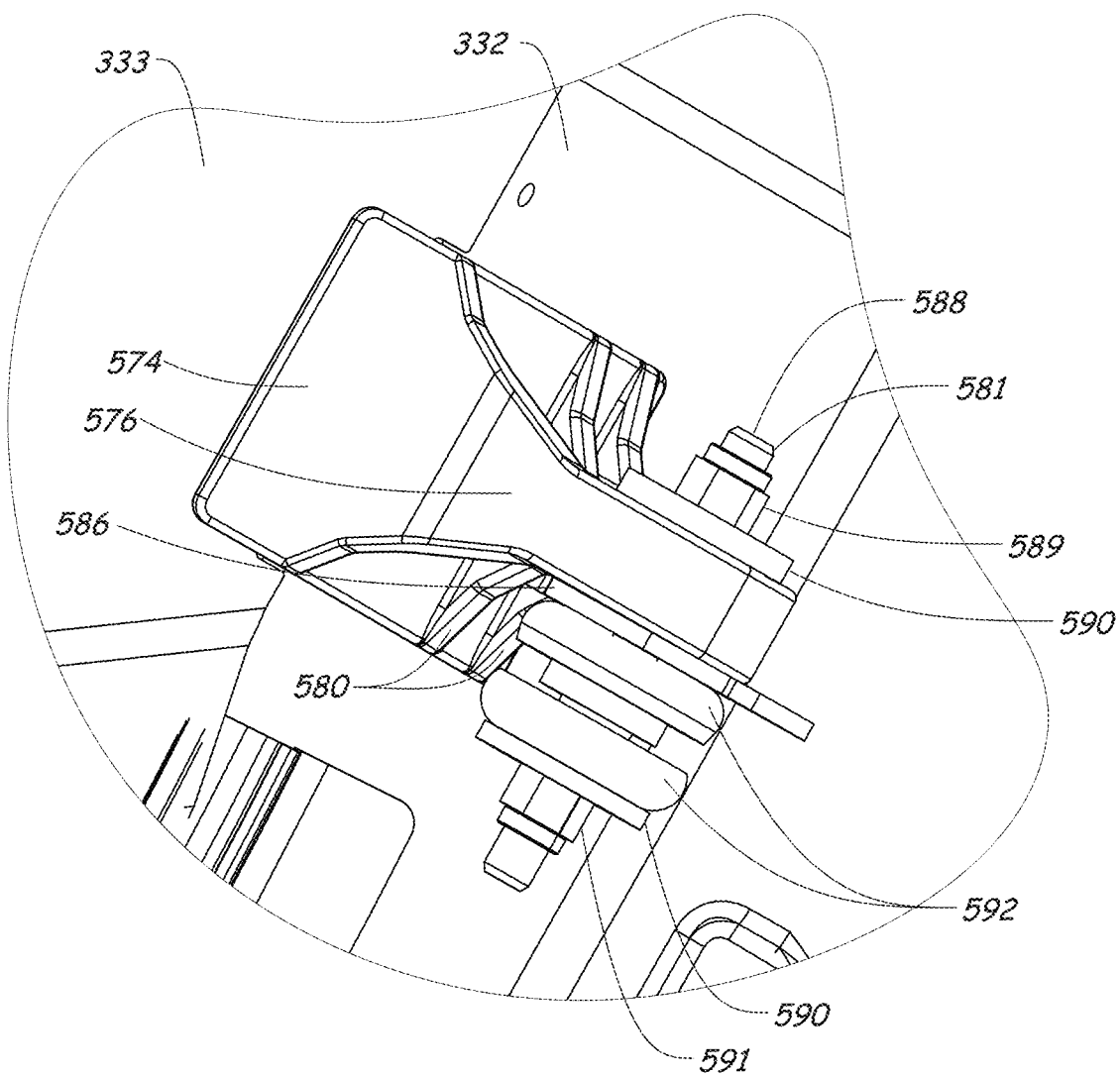
FIGS. 13-16 are diagrammatic illustrations of an embodiment of a mounting tab or cab mount and related components used to secure the cab shown in FIG. 4 to the frame of the power machine in some exemplary embodiments.
Figure 14:
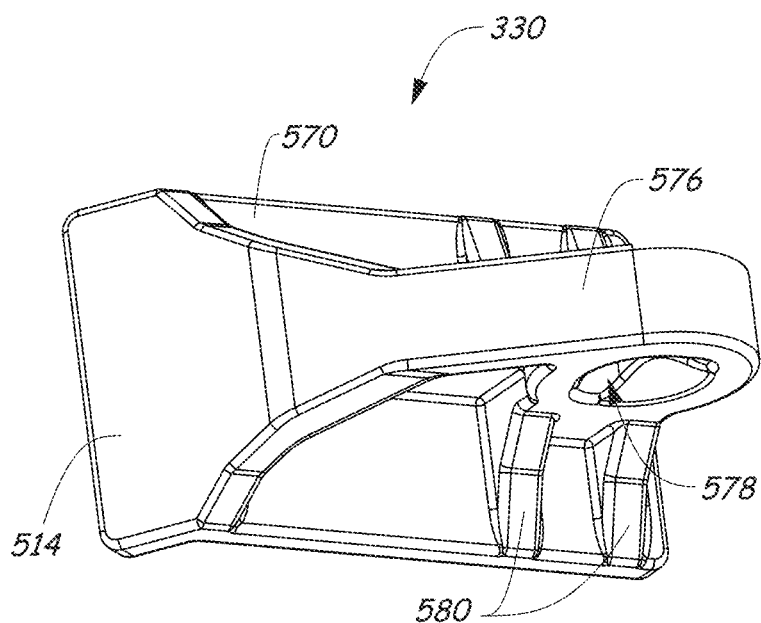
Figure 15:
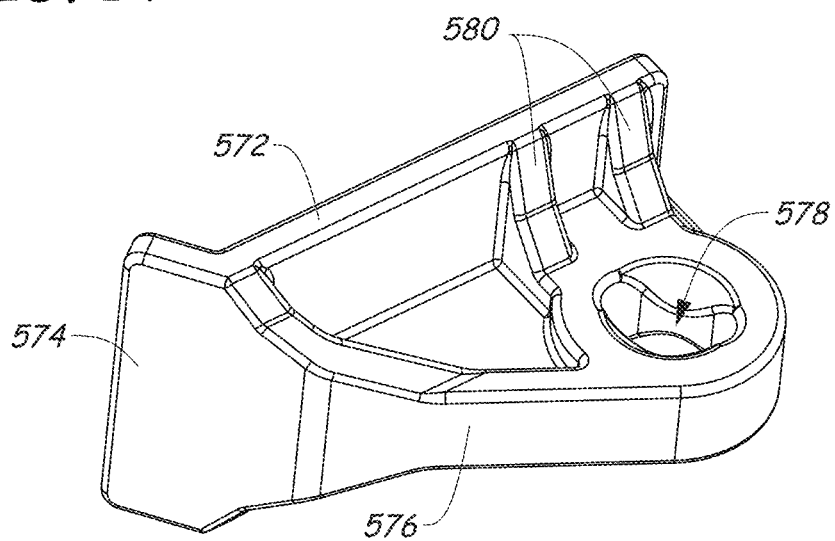

Mounting portion 576 of cab mount 330 includes an aperture 578 extending through the portion 576 which is configured to receive a threaded stud 588 of cab mounting structure 581. Cab mount 330 can also, in some embodiments, include ribs or members 580 on one or both of base portion 570 and mounting portion 576. Ribs 580 extend at least partially parallel to the direction that aperture 578 extends through mounting portion 576 and are configured to receive an anti-rotation member 586 of mounting structure 581 between the ribs 580 to aid in preventing rotation of mounting structure 581. This is illustrated in FIG. 13. In some embodiments, the cab mount can be used on either side of the cab and thus ribs 580 are positioned on each side of the mounting portion 576.

Figure 16:
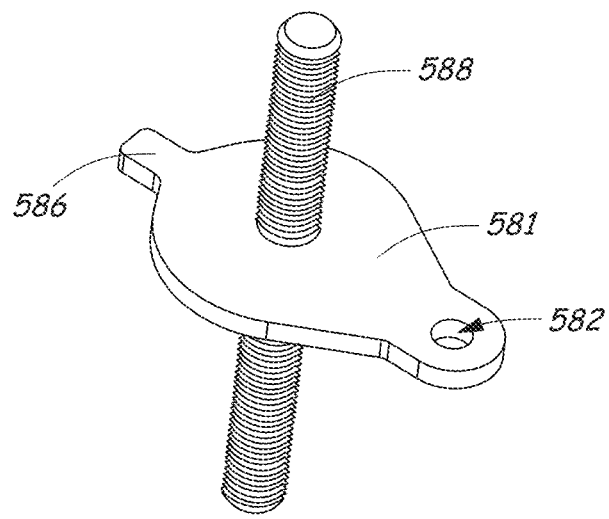

Referring now more specifically to FIGS. 13 and 16, cab mounting structure 581 and corresponding components are described in greater detail. As noted above, a threaded stud 588 of mounting structure 581 is configured to extend through aperture 578 of mounting portion 576 and to be secured at either end with one of nuts 589 and 591. Nut 591 secures mounting structure 581 to machine frame 510, while nut 589 secures cab mount 330 and the cab frame to the cab mounting structure 581, and thereby the machine frame 510 (although mounting structure 581 is not shown as being attached to the frame in the FIGs.). Washers 590 and isolators 592 can be positioned between nuts 589 and 591 to aid in securing cab mount 330 to cab mounting structure 581, and isolating vibrations from being transferred between frame and cab assembly 300.

Figure 18:
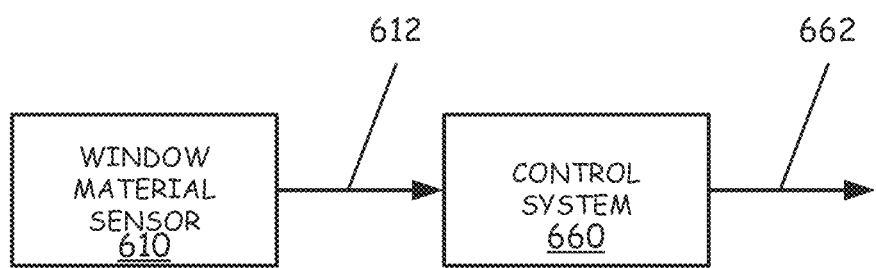
FIG. 18 is a block diagram illustrating a system in which the window material sensor output is used to control operation of the power machine.

Shown schematically in FIG. 18 is a window material sensor 610 configured and positioned to detect the presence of transparent material portions (e.g., 366 and 368 shown in FIG. 7) on the cab assembly. For example, sensor 610 can be a Hall effect sensor, a proximity sensor, a current sensor, a conductivity sensor, a capacitive sensor, an optical sensor, or other types of sensor configured with circuitry to provide an output indicative of the presence or absence of a transparent material portion 366 and 368 on the cab assembly. As such, cooperative components (e.g., magnets, optically detectable material, conductive material, etc.) can also be included in or near the transparent material portion to aid sensor 610 in detecting the presence of the material.

In the schematic block diagram of FIG. 18, the illustrated system of a power machine provides the output 612 of material sensor 610 as an input to control system 660. Using sensor 610 to provide output 612, control system 660 is configured such that if a transparent material portion is damaged or removed from the cab assembly, the control system generates control signals 662 to prevent or limit operation of the power machine to lessen the likelihood of the operator of the power machine being injured. Control system 660 can be as described above with reference to control system 160, and as such can include microprocessors or other control circuitry configured to generate the control signals responsive to output 612. Configuration of the control system can be with discrete circuit components, with non-transient computer readable instructions stored on a computer-readable medium, etc. Control signals 662 can be, for example, controls signals provided to the machine power source (e.g., power source 120 shown in FIG. 1), to other hydraulic system components, etc.

In some embodiments, control signals 662 prevent the power machine from starting, or cause the power machine to shut down, when sensor 610 detects that a transparent material portion is missing or damaged. In other embodiments, control signals allow the engine of the power machine to run but prevent travel of the power machine or actuation of the lift arm actuator or other actuators. In still other embodiments, travel of the power machine is maintained when sensor 610 detects that transparent material is missing or damaged but raising or lowering of the lift arm is prevented. This allows an operator to drive the power machine onto a truck bed for hauling to a service center for replacement of the transparent material portions. In still other embodiments, limited power machine functionality can be restored with entry of an authorization code into a user input device.

Figure 19:
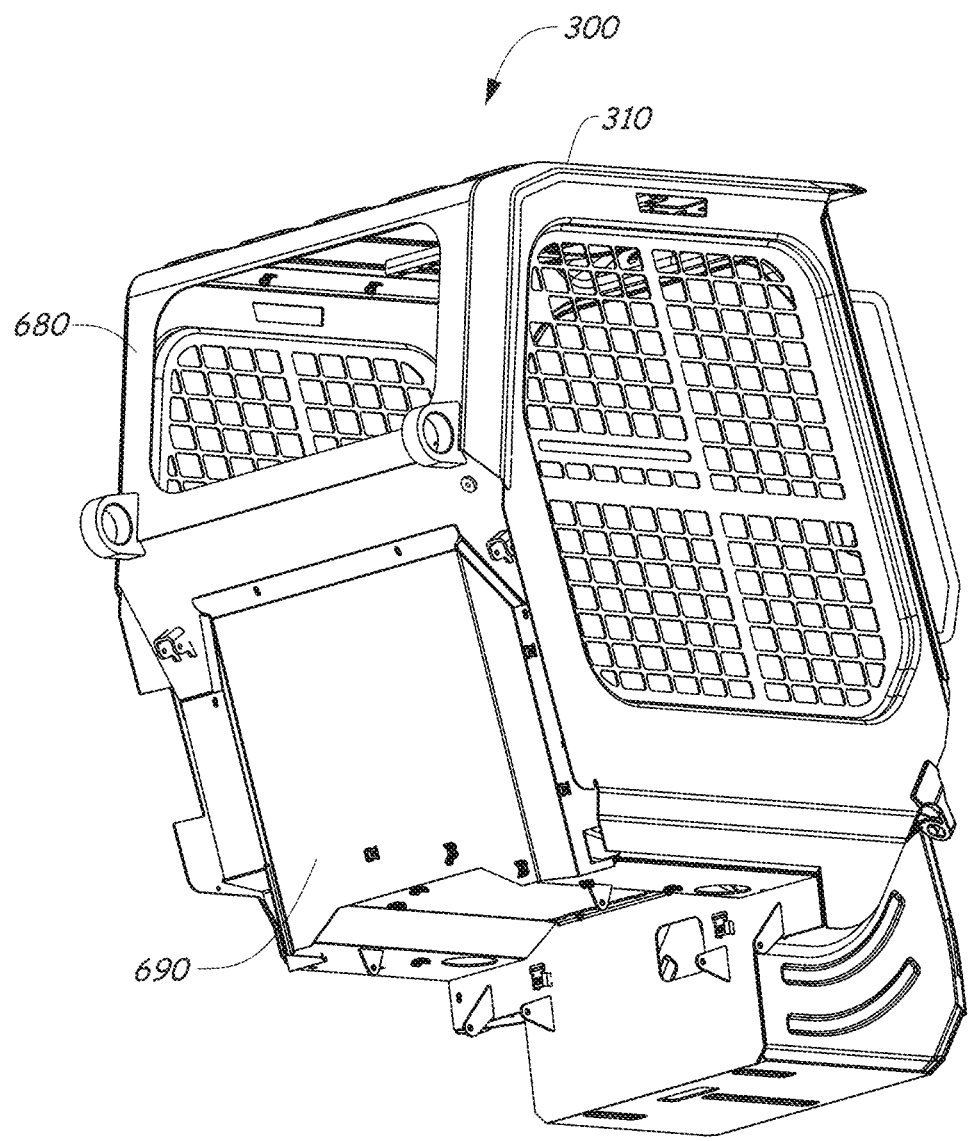
FIG. 19 is a perspective view illustration of a cab assembly including a main weldment subassembly and a seat subassembly.
Figure 20:
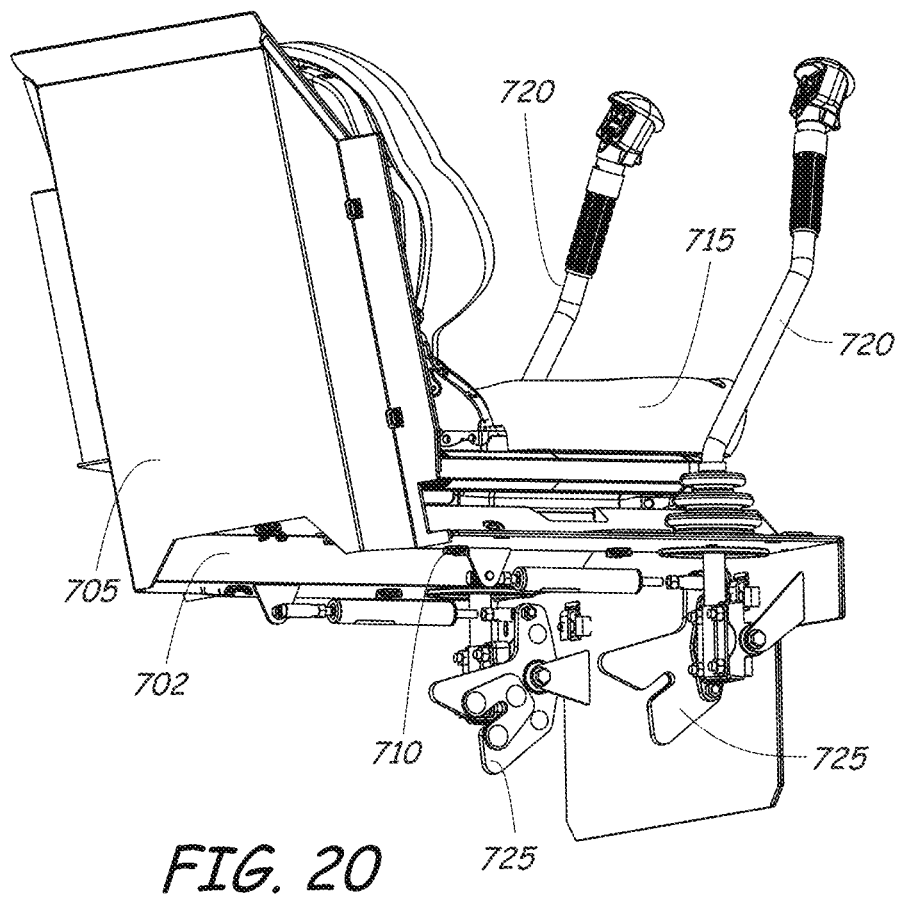
FIG. 20 is a perspective view illustration of an example seat subassembly as shown in FIG. 19.

Referring now to FIGS. 19 and 20, a further exemplary embodiment is shown in which cab assembly 300 includes a main weldment subassembly 680 and a seat panel subassembly 690. Although shown with respect to cab assembly 300, the features of FIGS. 20 and 21 are included with other cab assemblies, such as cab assembly 300, in some embodiments. The main weldment subassembly 680 includes the cab frame 310 forming the sides, front, top, floor and other portions of the cab assembly. The seat panel subassembly 690 includes a seat support structure 702 on which a seat 715 is mounted. In some embodiments, seat support structure 702 includes a seat back panel 705 and a seat lower panel 710 with the seat 715 supportively coupled to both panels. In other embodiments, seat 715 is supported by only a single panel (typically panel 710), but both of panels 705 and 710 can be included to provide outer cab assembly surfaces when the seat panel subassembly 690 is welded, riveted or otherwise secured to main weldment subassembly 680. The seat lower panel 710 forms a first portion of the seat support structure 702 and extends at least partially horizontally, while the seat back panel 705 forms a second portion of the seat support structure extending at least partially vertically upward from the first portion 710. In exemplary embodiments, the seat support structure 702 can also include a third portion 712 extending at least partially vertically downward from the first portion 710. This corresponds to an area of the seat panel assembly where an operator's legs will extend when operating the power machine.

Also included in seat subassembly 690 are joystick or other controllers 720, along with any linkages or connection mechanisms 725 which couple the controllers to corresponding drive or control components positioned on the power machine frame when the cab assembly 300 is pivoted into an operational position. Other components can also be included with seat subassembly 690. By allowing seat subassembly 690 to be assembled separately from main weldment subassembly 680 during the manufacturing process, better access is provided for welding the main weldment subassembly 680. Also, better access is provided for mounting controllers 720, for mounting seat 715, for routing any wiring, electrical and electronic components, cab interior features, HVAC components and the like. After each of main weldment subassembly 680 and a seat subassembly 690 are produced, they can be secured together to create cab assembly 300.

Although the present invention has been described with reference to preferred embodiments, workers skilled in the art will recognize that changes may be made in form and detail without departing from the spirit and scope of the invention.

What is claimed is:

1. A frame of a cab assembly of a power machine, the frame including:
a main portion configured to have an aperture to provide operator access to the cab assembly from a front of the power machine;
a lower frontal portion providing a space for the operator's feet while the operator is seated in the cab assembly, the lower frontal portion comprising:
a first side having a first side surface with a plurality of substantially parallel arcuate shaped reinforcement ribs formed therein; and a front having a front surface positioned such that the lower frontal portion of the frame extends below the main portion of the frame.

2. The frame of claim 1, wherein the plurality of substantially parallel arcuate shaped reinforcement ribs of the first side surface are substantially parallel to an intersection between the first side surface and an adjacent portion of frame of the cab assembly.

3. The frame of claim 1, wherein the front surface of the front of the lower frontal portion is positioned such that the lower frontal portion is substantially rearward of the front of the main portion of the cab.

4. A cab for a power machine, the cab assembly comprising:
   a frame providing a main portion of the cab, an aperture to provide an operator ingress into and egress from a front of the main portion of the cab, and a lower frontal portion of the cab, wherein the frame of the cab is configured to be pivotally attached to a power machine frame at a cab pivot attachment such that the main portion of the cab and the lower frontal portion of the cab pivot together about the cab pivot attachment;
   wherein the lower frontal portion of the frame extends below the main portion of the frame and below the aperture, the lower frontal portion of the frame providing a space for the operator's feet while the operator is seated in the cab.

5. The cab of claim 4, wherein the lower frontal portion comprises:
   a first side having a first side surface; and
   a front having a front surface.

6. The cab of claim 5, wherein the front surface of the lower frontal portion is positioned such that the lower frontal portion is substantially rearward of the front of the main portion of the cab.

7. The cab of claim 6, wherein the first side surface has a plurality of arcuate shaped reinforcement ribs formed therein.

8. The cab of claim 7, wherein the plurality of arcuate shaped reinforcement ribs of the first side surface are substantially parallel to an intersection between the first side surface and an adjacent portion of frame of the cab assembly.

9. A cab for a power machine, the cab assembly comprising:
   a frame providing a main portion of the cab, an aperture to provide an operator ingress into and egress from a front of the main portion of the cab, and a lower frontal portion of the cab, wherein the lower frontal portion comprises a first side having a first side surface and a front having a front surface, and wherein the first side surface has arcuate shaped reinforcement ribs formed therein which are substantially parallel to an intersection between the first side surface and an adjacent portion of the frame of the cab assembly;
   wherein the lower frontal portion of the frame extends below the main portion of the frame and below the aperture, the lower frontal portion of the frame providing a space for the operator's feet while the operator is seated in the cab.

\* \* \* \* \*